United States Patent [19]

Edakubo et al.

[11] Patent Number: 4,558,382
[45] Date of Patent: Dec. 10, 1985

[54] VIDEO SIGNAL REPRODUCING APPARATUS

[75] Inventors: Hiroo Edakubo, Tokyo; Nobutoshi Takayama; Hiroyuki Takimoto, both of Kanagawa, all of Japan

[73] Assignee: Canon Kabushiki Kaisha, Tokyo, Japan

[21] Appl. No.: 576,028

[22] Filed: Feb. 1, 1984

[51] Int. Cl.$^4$ .................................................. G11B 5/58
[52] U.S. Cl. ...................................... 360/77; 360/10.2
[58] Field of Search ......................... 360/10.2, 10.3, 77

[56] References Cited

U.S. PATENT DOCUMENTS

4,439,799  3/1984  Haubrich et al. ....................... 360/77
4,497,000  1/1985  Terada et al. ........................... 360/70

Primary Examiner—George G. Stellar
Attorney, Agent, or Firm—Toren, McGeady, Stanger, Goldberg & Kiel

[57] ABSTRACT

A video signal reproducing apparatus which is arranged to reproduce a composite signal formed by superimposing plural kinds of pilot signals of different frequencies upon a video signal one after another from recording tracks formed by the composite signal on a recording medium comprises: a plurality of reproducing heads arranged to trace the recording tracks one after another on the recording medium; a switch-over device for producing the outputs of the plurality of reproducing heads by switching them over from one to another; a reference signal generating device for producing plural kinds of reference signals of different frequencies which are substantially the same as those of the pilot signals; selecting device for selectively producing one of the plural kinds of reference signals generated by the reference signal generating means; a detecting device for detecting the positional errors of the reproducing heads relative to the recording tracks by using the reference signal obtained from the selecting means in conjunction with at least one of the plural kinds of pilot signals; and a control device for controlling the selecting means with the outputs of the reproducing heads not included in the output of the switch-over device.

37 Claims, 6 Drawing Figures

VIDEO SIGNAL REPRODUCING APPARATUS

BACKGROUND OF THE INVENTION

1. Field of the Invention

This invention relates to a video signal reproducing apparatus and more particularly, to an apparatus arranged to reproduce a composite signal which is formed by superimposing plural kinds of pilot signals of different frequencies upon a video signal one after another from recording tracks formed by the composite signal on a recording medium.

2. Description of the Prior Art

Figure 1:
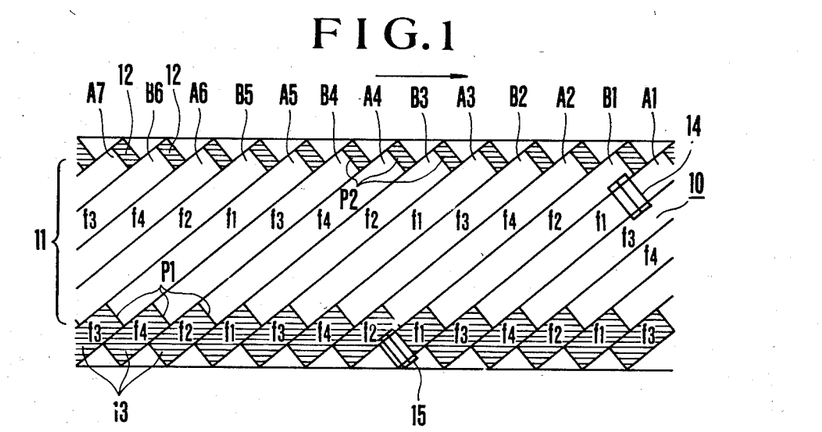
FIG. 1 is an illustration of the pattern of recording tracks formed on a tape.

For a video tape recorder of the kind having rotating heads arranged to record and/or reproduce a video signal on a video tape such as a magnetic recording tape (hereinafter will be called VTR for short), tracking methods have been proposed for accurately tracing the recording tracks of video signal in carrying out reproduction thereof. Such prior art methods include a first method in which a control signal is recorded along the edge of the video tape for tracking control and a second method in which four kinds of pilot signals of different frequencies are recorded beforehand by superimposing them on a video signal. The details of the second method are as described below:

In the accompanying drawings, FIG. 1 shows a recording pattern on a video tape. The illustration of FIG. 1 includes a video tape 10; an area 11 provided for obtaining a reproduced video signal; overlapped recording areas 12 and 13 in which the video signal is overlappingly recorded; a first recording/reproducing head 14 (hereinafter will be called A head); and a second recording/reproducing head 15 (hereinafter will be called B head). The recording/reproducing heads 14 and 15 have different azimuth angles from each other. Video signal recording tracks A1–A7 are recorded by the A head 14 while video signal recording tracks B1–B6 are recorded by the B head 15. One of pilot signals (hereinafter will be called pilot signals F1, F2, F3 and F4) of four different frequencies, f1, f2, f3 and f4, are recorded in each of the recording tracks, that is, one for every field period of the video signal, by superimposing them upon the video signal.

In reproducing the video signals thus recorded, a pilot signal reproduced by the reproducing head is multiplied by a reference signal of frequency which is substantially the same as that of a pilot signal superimposed on a recording track which is mainly traced (hereinafter will be called the main track) by the reproducing head. Then, crosstalk components from adjacent tracks located in front and in rear of the main track are separated from a multiplication output thus obtained. The levels of these two crosstalk components are compared with each other to obtain a tracking control signal corresponding to the positional error of the reproducing head relative to the main track.

This method enables tracking control signals to be obtained throughout the video signal recording track and thus ensures accurate tracking even in the case of a curved video signal recording track. Further when the reproducing head is mounted on an electric-to-mechanical converting element such as a bi-morph element to make its rotating face shiftable in a direction intersecting the video signal track, accurate tracking also can be accomplished even when the tape is to be moved for reproduction at a speed different from the speed at which recording is performed. In that instance, however, the multiplication must be performed by accurately determining a reference signal having the same frequency as that of the pilot signal recorded in the main track. For example, when a reproducing operation is to be performed on the recorded tape of FIG. 1 at a reproducing speed three times as high as the recording speed, the reproducing operation is performed as follows: After the record of the track A1 (having pilot signal of frequency f1) is reproduced by the A head, the track B2 (having pilot signal of frequency f3) is reproduced by the B head. Then, the A head reproduces the track A4 (f4) and the B head the track B5 (f2) and the tracks are thus reproduced one after another. The frequency of the reference signal to be used for the multiplication changes for every field period of the video signal in such a manner as f1 - f3 - f4 - f2 - f1 - f3 ---, which differs from the sequence of frequency rotation f1 - f2 - f4 - f3 of the pilot signals with which recording is accomplished. This can be understood from the following table showing frequency rotations which take place during reproducing operations carried out at varied speeds integral numbers times as high as the recording speed:

TABLE 1

| K | Frequency rotation |
|---|---|
| 4n | f1  f2, f2  f4, f4  f3, or f3  f1 |
| 4n + 1 | f1 → f2 → f4 → f3 → f1 → ... |
| 4n + 2 | f1  f2, f2  f4, f4  f3, or f3  f1 |
| 4n + 3 | f1 → f3 → f4 → f2 → f1 → f3 ... |

Figure 2:
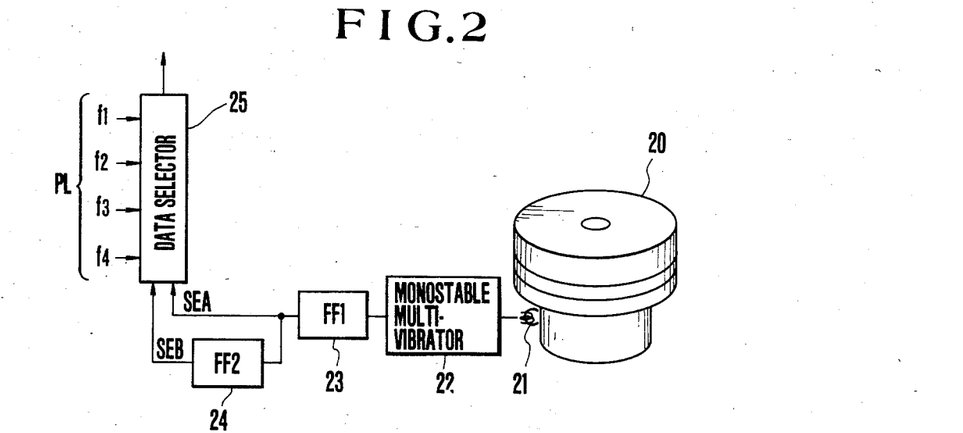
FIG. 2 is a block diagram showing the arrangement of a reference signal generating part.
Figure 3:
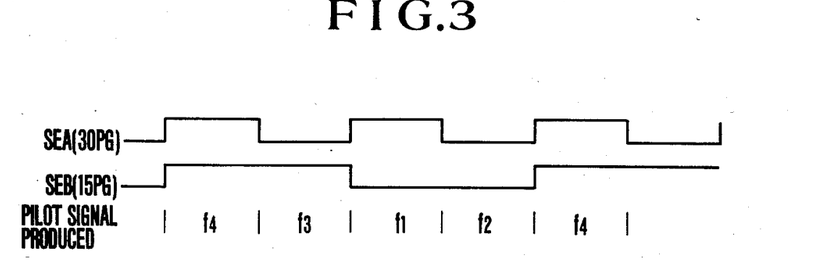
FIG. 3 is a timing chart showing signals produced from various parts of FIG. 2.

Frequency shifting rotation for reproduction at tape speeds which are integral numbers times as high as recording tape speed Notes:
K: The multiplying rate of reproducing tape speed relative to tape speed adopted for recording
n: An integer While the above table shows the frequency rotation for reproducing operations carried out at tape speeds integral numbers times as high as the tape speed used for recording, the frequency rotation becomes more complex for reproducing operations to be carried out at tape speeds increased at multiplying rates other than those obtained by multiplying the recording speed by integers. Especially, in the case where a tape speed is to be changed during a reproducing operation, it has been impossible to determine the frequency of the reference signal to be used and thus, tracking control has been hardly possible FIG. 2 is a circuit diagram showing a circuit arranged to effect the rotation of the frequencies of reference signals to be generated. FIG. 3 is a timing chart showing the timing of the operation of the circuit of FIG. 2.

Referring to FIG. 2, a magnetic head 21 is arranged to detect the position of a video head of a cylinder 20 on which the rotating video head is mounted. The output of the magnetic head 21 is delayed by a monostable multivibrator 22. The output is then processed by a flip-flop (hereinafter will be called FF) 23 and is changed into a head switchover pulse signal SEA, which corresponds to the signal known by the name of 30 PG. This signal SEA is then supplied to a data selector 25. Meanwhile, the signal SEA is also frequency divided by an FF 24 and is supplied to the data selector 25 as another selected input SEB. The data selector operates as shown in the following table:

TABLE 2

| Selected input | | Truth values of data selector 25 | | | | Reference signal produced |
|---|---|---|---|---|---|---|
| SEA | SEB | f1 | f4 | f2 | f3 | |
| H | L | H | — | — | — | f1 |
| H | H | — | H | — | — | f4 |
| L | L | — | — | H | — | f2 |
| L | H | — | — | — | H | f3 |

Notes:
H: High level
L: Low level

As shown in Table 2 and FIG. 3, the frequency of the reference signal produced changes in synchronism with the timing of the head switch-over and becomes f4 when both the signals SEA and SEB are produced at a high level (hereinafter will be called H); becomes f3 when the signal SEA is at a low level (hereinafter will be called L) while the signal SEB is at H; becomes f1 when the signal SEA is at H while the signal SEB is at L; and becomes f2 when both of the signals SEA and SEB are at L. However, this arrangement does not enable the apparatus to shift the rotation of frequency according to a varied tape speed set at the time of reproduction. The tape speed at which reproduction can be accomplished thus has been limited to speeds $4n+1$ times as high as the tape speed used for recording.

SUMMARY OF THE INVENTION

A principal object of the present invention is to provide a video signal reproducing apparatus which is capable of obviating the above-stated shortcoming of the apparatuses of the prior art.

It is another object of the invention to provide a video signal reproducing apparatus which is capable of carrying out a reproducing operation by setting the moving speed of a recording medium at any speed desired.

It is a further object of the invention to provide a video signal reproducing apparatus which is capable of performing tracking control by means of pilot signals superimposed upon a video signal at any moving speed of the recording medium.

It is a still further object of the invention to provide a video signal reproducing apparatus which is capable of performing tracking control by effectively utilizing recorded signals not used for reproduction of a video signal.

In view of these objects, a video signal reproducing apparatus which is arranged according to the invention as an embodiment thereof to reproduce a composite signal formed by superimposing plural kinds of pilot signals of different frequencies upon a video signal one after another from recording tracks formed by the composite signal on a recording medium comprises: A plurality of reproducing heads arranged to trace the recording tracks one after another on the recording medium; switch-over means for producing the outputs of the plurality of reproducing heads by switching them over from one to another; reference signal generating means for producing plural kinds of reference signals of different frequencies which are substantially the same as those of the pilot signals; selecting means for selectively producing one of the plural kinds of reference signals generated by the reference signal generating means; detecting means for detecting the positional errors of the reproducing heads relative to the recording tracks by using the reference signal obtained from the selecting means in conjunction with at least one of the plural kinds of pilot signals; and control means for controlling the selecting means with the outputs of the reproducing heads not included in the output of the switch-over means. These and further objects and features of the present invention will become apparent from the following detailed description of the preferred embodiments thereof taken in connection with the accompanying drawings.

DETAILED DESCRIPTION OF THE PREFERRED EMBODIMENT

Figure 4:
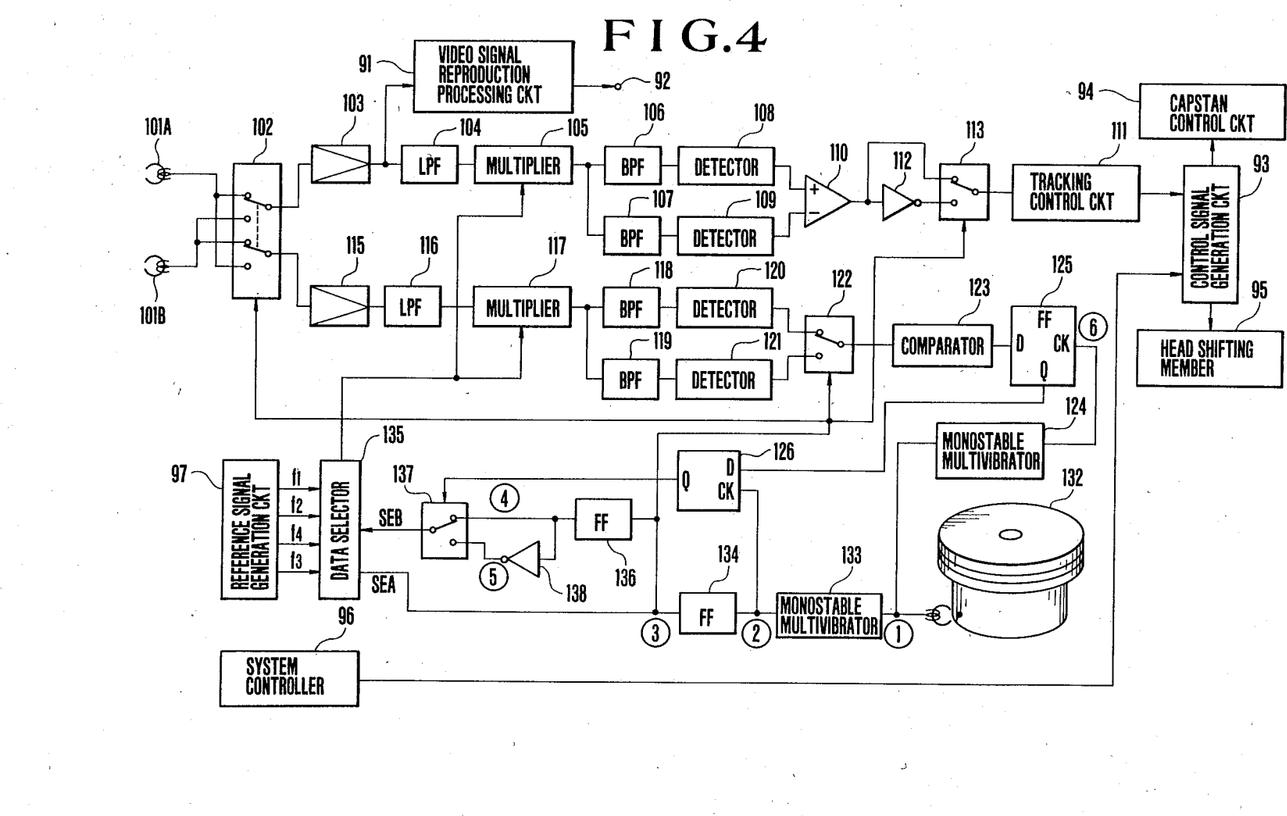
FIG. 4 is a circuit diagram showing the arrangement of essential parts of a VTR arranged as an embodiment of the present invention.
Figure 5:
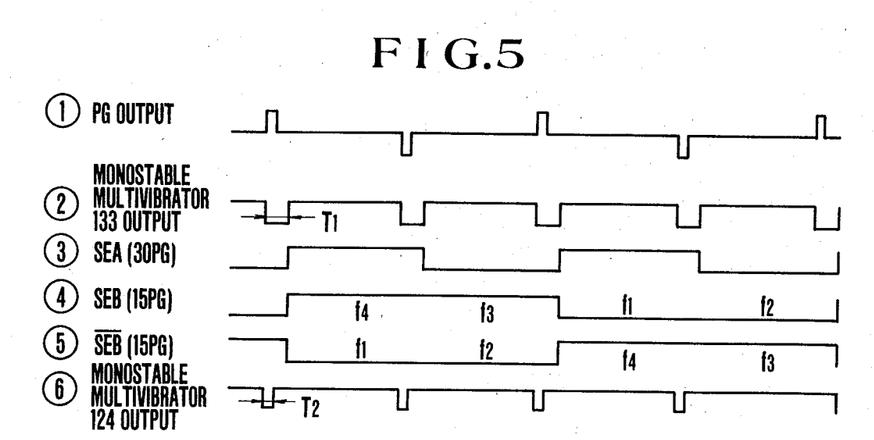
FIG. 5 is a timing chart showing signals produced from various parts of FIG. 4.

FIG. 4 shows in a block diagram the arrangement of essential parts of a VTR as an embodiment of the invention. FIG. 5 is a timing chart showing the timing of signals produced from various parts of the embodiment shown in FIG. 4. In this embodiment, pilot signals are arranged in four different frequencies f1–f4. These frequencies are arranged to be f1=102 KHz, f2=119 KHz, f3=148 KHz and f4=165 KHz respectively. In recording, a composite signal is recorded on a recording tape in a pattern as shown in FIG. 1 with these pilot signals superimposed upon a video signal by means of the circuit shown in FIG. 2. In FIG. 1, reference symbols P1 and P2 indicate head switch-over points at which switch-over from one head to another is effected by a head switch-over signal. In FIG. 4, a head 101A corresponds to the head 14 of FIG. 1 called the A head. Another head 101B corresponds to the head 15 of FIG. 1 called the B head.

The following description of operation of the embodiment will be directed to tracking control: When a video signal is reproduced by the head 101A, the output of the head 101A is supplied to a reproducing circuit system via a head output change-over switch 102 and an amplifier 103. In other words, the output of the amplifier 103 is supplied to a video signal reproduction processing circuit 91 to have the video signal reproduced there. The reproduced video signal is put out from an output terminal 92. Meanwhile, the output of the amplifier 103 is supplied to a low-pass filter 104 (hereinafter will be called LPF) to have the reproduced pilot signal separated from the video signal by the LPF 104. The reproduced pilot signal thus separated is supplied to a multiplier 105. Assuming that the frequency of the pilot signal recorded in the main track is 119 KHz, the reproduced pilot signal includes a crosstalk component of frequency 102 KHz from an adjacent track located in front of the main track and another crosstalk component of frequency 165 KHz from an adjacent track located in rear of the main track. Then, when a reference signal of frequency 119 KHz is applied to the reproduced pilot signal to have the latter multiplied by the former, the output signal produced from the multiplier 105 includes spectra of 238 KHz, 102+119=221 KHz, 119−102=17 KHz, 165+119=284 KHz and 165−119=46 KHz. Of these spectra, the component of 17 KHz and the component of 46 KHz are attributable to the crosstalk signals included in the reproduced pilot signal. The levels of these components, therefore, represent the amount of crosstalk. These components are then taken out via band-pass filters 106 and 107 (each of these band-pass filters hereinafter will be called BPF for short). The outputs of these BPF's are subjected to detection by detection circuits 108 and 109 and are then respectively supplied to a differential amplifier 110. The amplifier 110 then produces a head position error detection signal. This signal is made into a tracking control signal by a tracking control circuit 111. The tracking control signal is supplied via a control signal generation circuit 93 to a capstan control circuit 94 and a head shifting member 95 such as a bi-morph element or the like. A capstan and the bi-morph or the like are then controlled in such a manner as to reduce a level difference detected by the differential amplifier 110. Further, a system controller 96 is arranged to provide the control signal generation circuit 93 with a basic shifting value of tape speed and that of the head shifting member 95 corresponding thereto.

The selecting arrangement for selection of a reference signal by which the pilot signal is to be multiplied at the multiplier 105 is arranged basically in the same manner as the circuit of FIG. 2 used for recording. More specifically, a rotation phase detection pulse PG 1 representing the rotation phase of a cylinder 132 is delayed for a period of time T1 by a monostable multivibrator 133 to obtain a signal 2 . The signal 2 is frequency divided by a flip-flop 134 (hereinafter will be called FF) to obtain a signal of 30 Hz (hereinafter will be called the signal 30 PG). The signal 30 PG 3 is arranged to be supplied to a selection input terminal SEA of a data selector 135. Another FF 136 further frequency divides the signal 30 PG 3 to make it into a signal 15 PG 4 . The signal 15 PG is arranged to be supplied to a selection input terminal SEB of the data selector 135 via a switch 137. The data selector 135 is arranged to perform the same function as the function shown in Table 2 and thus selectively produces one of four different reference signals generated by a reference signal generation circuit 97.

In this specific embodiment, the heads 101A and 101B have different azimuth angles which are arranged in such a manner that: A reference signal of frequency f1 or f4 is used for multiplication when reproduction is performed with the head 101A while a reference signal of frequendy f2 or f3 is used when reproduction is performed with the other head 101B. It therefore suffices to select the multiplier frequency by merely distinguishing the frequency f1 or f4 from f2 or f3 and vice versa.

Referring further to FIG. 4, a signal which is reproduced by the head 101B which is not used for reproduction of the video signal is supplied via the head change-over switch 102 to a control circuit system. In the control circuit system, the signal to be supplied to an amplifier 115 is only a signal reproduced from the overlapped recording area 13. Then, a reproduced pilot signal is extracted by an LPF 116 from the signal reproduced from the overlapped recording area 13. A multiplication circuit 117 multiplies this signal by the same reference signal that is supplied to the other multiplication circuit 105. As shown in FIG. 1, in the part before the head switch-over point P1, there is superimposed a preceding pilot signal. Assuming that the signal in the track A1 is being reproduced by the head 101A, the other head 101B (15 in FIG. 1) begins to reproduce the overlapped recording part when the head 101A (14 in FIG. 1) is reproducing the latter half portion of the track A1. If, in this instance, the reproducing operation is being performed at the same tape speed as in recording, the head 101B comes close to the track B1. If the reproducing operation is being performed at a speed three times as high as the tape speed at which recording is performed, the head 101B comes close to the track B2. Then, a pilot signal separated from the output signal of the head 101B is multiplied by a reference signal of the same frequency as that of the reference signal by which the pilot signal separated from the output signal of the head 101A is multiplied.

In the case of reproduction at the same tape speed as the tape speed used for recording, the head 101B is at the track B1 as mentioned above. Therefore, a pilot signal of frequency f1=102 KHz is recorded in the overlapped part. Accordingly, this pilot signal is multiplied by the reference signal of frequency f1 and then, the output signal produced from the multiplier 117 includes spectra of 250 KHz, 204 KHz, 221 KHz, 46 KHz and 17 KHz as shown in Table 3. Whereas, in the event of recording at a tape speed three times as high as the recording speed, the head 101B is at the track B2 as mentioned above. In that event, a pilot signal of frequency f4 is recorded in the overlapped recording area. Therefore, with the pilot signal multiplied by the reference signal of frequency f1, the output signal of the multiplier 117, will include spectra of 221 KHz, 267 KHz, 250 KHz, 17 KHz, 64 KHz and 46 KHz as is shown in Table 3. Further, as apparent from Table 3, if the pilot signal which is reproduced from the overlapped recording area is multiplied by a reference signal of frequency different from that of the pilot signal recorded in the main track, there appears a spectrum of 63 KHz when the frequency of the pilot signal superimposed on the main track is f1 or f4 and a spectrum of 29 KHz when this frequency is f2 or f3.

TABLE 3

Output frequency components of the multiplier resulting from pilot signal reproduction from overlapped recording area (1)

| Shift of track | Frequencies of pilot signals reproduced from overlapped recording areas in main, front and rear tracks (KHz) | Frequency of reference signal to multiplier (KHz) | Output frequency components of multiplier (KHz) |
|---|---|---|---|
| f1 → f2 | Front: f3 148 | f1 102 | 250 46 |
| | Main: f1 102 | | 204 0 |
| | Rear: f2 119 | | 221 17 |
| f1 → f3 | Front: f2 119 | f1 102 | 221 17 |
| | Main: f4 165 | | 267 63 |
| | Rear: f3 148 | | 250 46 |
| f2 → f4 | Front: f1 102 | f2 119 | 221 17 |
| | Main: f2 119 | | 238 0 |
| | Rear: f4 165 | | 284 46 |
| f2 → f1 | Front: f4 165 | f2 119 | 284 46 |
| | Main: f3 148 | | 267 29 |
| | Rear: f1 102 | | 221 17 |
| f3 → f1 | Front: f4 165 | f3 148 | 313 17 |
| | Main: f3 148 | | 296 0 |
| | Rear: f1 102 | | 250 46 |
| f3 → f4 | Front: f1 102 | f3 148 | 250 46 |
| | Main: f2 119 | | 267 29 |
| | Rear: f4 165 | | 313 17 |
| f4 → f3 | Front: f2 119 | f4 165 | 284 46 |

TABLE 3-continued

| | | Output frequency components of the multiplier resulting from pilot signal reproduction from overlapped recording area (I) | |
|---|---|---|---|
| Shift of track | Frequencies of pilot signals reproduced from overlapped recording areas in main, front and rear tracks (KHz) | Frequency of reference signal to multiplier (KHz) | Output frequency components of multiplier (KHz) |
| f4 → f2 | Main: f4 165<br>Rear: f3 148<br>Front: f3 148<br>Main: f1 102<br>Rear: f2 119 | f4 165 | 330  0<br>313 17<br>313 17<br>330 63<br>284 46 |

The spectra of 63 KHz and 29 KHz are respectively extracted by BPF's 118 and 119 from the signal produced from the multiplier 117 which multiplies, by the reference signal, the pilot signal reproduced by the head not being used for reproduction of video signal. The outputs of the BPF's 118 and 119 are then subjected to detection by the detection circuits 120 and 121.

Further, in case that the track from which the video signal is being reproduced is a recording track of a positive azimuth, that is, a track having a pilot signal of frequency f1 or f4 superimposed on the video signal, frequency of 63 is produced. In the case of a track of negative azimuth, frequency of 29 KHz is produced. Therefore, the outputs of the detection circuits 120 and 121 are switched over by means of the signal 30 PG by a change-over switch 122. The output of the switch 122 is supplied to a comparator 123. The signal output levels 63 KHz and 29 KHz appear when the track shifts take place in the manner of f1 - f3, f2 - f1, f3 - f4 and f4 - f2 and do not appear when the track shifts take place in the manner of f1 - f2, f2 - f4, f3 - f1 and f4 - f3. In view of the width of the head, the comparator 123 is arranged to produce an output therefrom when the levels of the outputs of the above-stated detection circuits 120 and 121 become higher than a certain level. Therefore, the output level of the comparator 123 becomes a high level (hereinafter will be called H for short) when the frequency of a reference signal to be used for the multiplication while the head is tracing the overlapped recording area differs from the frequency of the pilot signal superimposed on the main track in the overlapped recording area. In order to sample this signal before head switch-over, a signal 6 which is obtained by delaying the output PG of the cylinder 132 with a monostable multivibrator 124 which has a time constant of T1>T2 is supplied to the clock terminal CK of a D-type flip-flop 125 while the output of the comparator 123 is supplied to the terminal D of the flip-flop 125. Next, the output Q of the FF125 is supplied to another D-type flip-flop 126 while the signal 30 PG is supplied to the clock terminal CK of the FF126. This arrangement gives a signal which indicates whether the reference signal is correct or incorrect in synchronism with the timing of the switch-over operation on the head.

In other words, after the switch-over of the head, a pilot signal of a frequency different from that of the pilot signal recorded in the overlapped recording area 13 of the main track is recorded in exact conformity to the set sequence of rotation. Therefore, in the event that the pilot signal superimposed on the main track in the overlapped recording area differs in frequency from the reference signal by which the pilot signal is being multiplied, the sequence of frequency shifting rotation must be changed to another sequence. If not, the reference signals to be used for multiplication thereafter would also become incorrect. To solve this problem, the change-over switch 137 is driven by the output of the FF126 in such a manner that: When the head is tracing the overlapped recording area, i.e. when the output level of the FF126 is H, the signal 15PG 4 is inverted by an inverter 138 to make it into a signal 5 and is supplied to the selection input terminal SEB. With selection input SEB inverted, the abovestated rotation advances to an extent corresponding to two tracks, so that the pilot signal reproduced can be multiplied by a correct reference signal.

In the foregoing case a positive azimuth head and a negative azimuth head are alternately used. However, it is also possible to arrange a head of opposite azimuth in the vicinity of one of the heads to make the head into a double azimuth head and thus to permit alternate use of the same azimuth heads.

Figure 6:
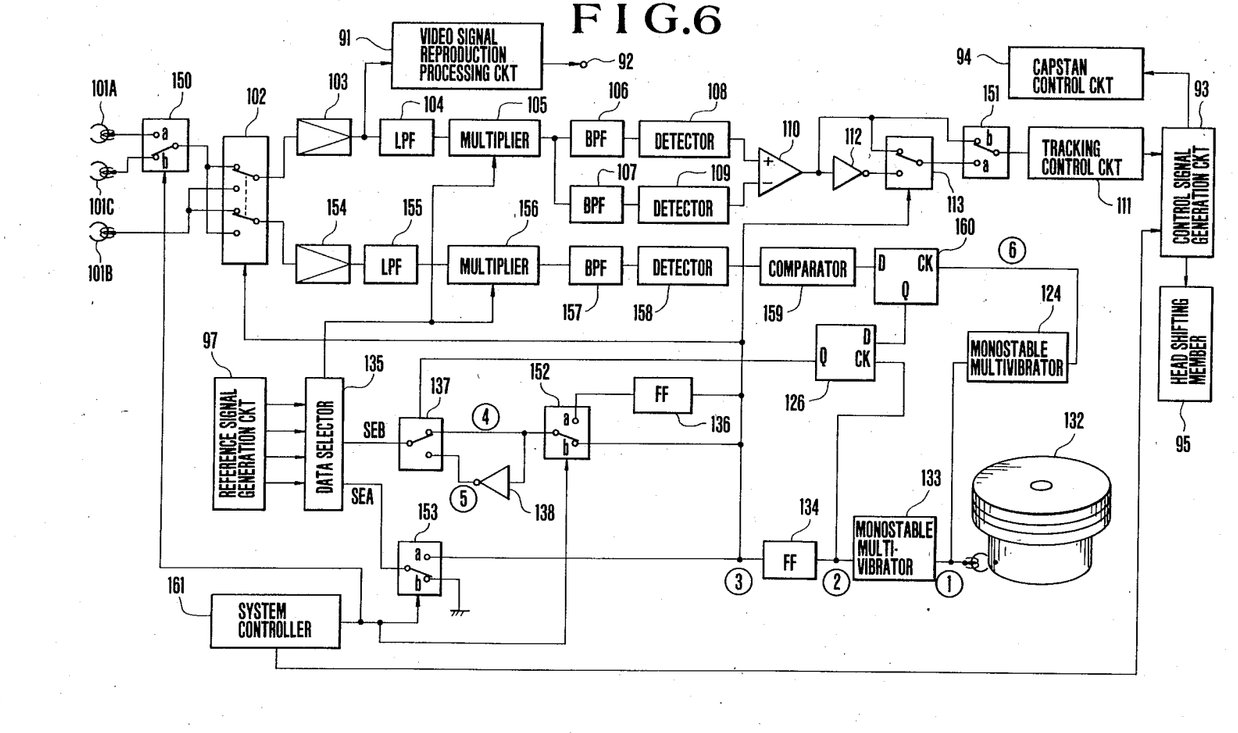
FIG. 6 is a circuit diagram showing the arrangement of essential parts of a VTR arranged as another embodiment of the invention.

When the heads thus arranged to be of the same azimuth are alternately used for reproducing recording tracks recorded at the same azimuth at a reproducing tape speed different from the recording speed, a still picture reproduction or a double speed reproduction, etc. can be carried out to give a better picture quality because the reproducing operation is performed on the tracks recorded at the same azimuth. FIG. 6 shows such arrangement as another embodiment of the present invention.

Referring to FIG. 6 which shows in a block diagram the essential parts of another embodiment of the invention, the parts functioning in the same manner as the corresponding parts of FIG. 4 are indicated by the same reference numerals and symbols as those used in FIG. 4. In this embodiment, a negative azimuth head is mounted in the vicinity of the head 101A. Switches 150, 151, 152 and 153 are arranged for switch-over between a normal reproducing operation to be carried out at a reproducing tape speed which is the same as the tape speed used for recording and a varied-speed reproducing operation to be carried out at a tape speed which differs from the recording speed. Each of these change-over switches is connected to its terminal "a" for the normal reproducing operation and to another terminal "b" at the time of the varied-speed reproducing operation. An amplifier 154 is arranged to amplify the reproduction output of a head not used for reproducing the video signal. The embodiment further includes a low-pass filter 155; a multiplier 156; a BPF 157; a detection circuit 158; a comparator 159; a D-type FF160; and a system controller which is arranged to produce a signal for shifting the contacts of the above-stated change-over switches 150-153.

In case of the varied-speed reproduction, the negative azimuth heads 101B and 101C are alternately used. As a result, these heads reproduce only the tracks having pilot signals of frequency f2 or f3 superimposed on the video signal recording areas. Accordingly, the shift of tracks requires consideration of only the shifts of frequencies of the superimposed pilot signals: f2 → f2, f2 → f3, f3 → f3 and f3 → f2. Table 4 shows the freuqency spectra to be produced from the multiplier 156 with pilot signals reproduced from the overlapped recording areas 13.

TABLE 4

Output frequency components of the multiplier resulting from pilot signal reproduction from overlapped recording area (2)

| Shift of track | Frequencies of pilot signals reproduced from overlapped recording areas in main, front and rear tracks (KHz) | Frequency of reference signal to multiplier (KHz) | Output frequency components of multiplier (KHz) |
|---|---|---|---|
| f2 → f2 | Front: f3 148 | f2 119 | 261 29 |
|  | Main: f1 102 |  | 221 17 |
|  | Rear: f2 119 |  | 238 0 |
| f2 → f3 | Front: f2 119 | f2 119 | 238 0 |
|  | Main: f4 165 |  | 284 46 |
|  | Rear: f3 148 |  | 267 29 |
| f3 → f3 | Front: f2 119 | f3 148 | 267 29 |
|  | Main: f4 165 |  | 313 17 |
|  | Rear: f3 148 |  | 296 0 |
| f3 → f2 | Front: f3 148 | f3 148 | 296 0 |
|  | Main: f1 102 |  | 250 46 |
|  | Rear: f2 119 |  | 267 29 |

As is apparent from Table 4, the multiplier produces 17 KHz when the pilot signal superimposed on the video signal recording area remains unchanged and 46 KHz when it changes. Therefore, in the case of varied-speed reproduction, the switch 153 is connected to terminal "b" to make the level of the input SEA of the data selector 135 low and thus to cause the data selector 135 to select only the reference signal of frequency f2 or f3. At the same time, the switch 152 operates to have siht signal 30PG supplied as the selection input SEB of the data selector 135. 17 KHz is produced from the multiplier 156 when the head is tracing the overlapped recording area 12, and thus it is not necessary to change the frequency of the reference signal to be supplied to the multiplier 156. The output of the D-type FF126 causes the switch 137 to have the output of the inverter 138 supplied to the data selector 135 as the input SEB. With the level of the input SEB thus inverted, it suffices to have frequency rotation effected only for two tracks. Therefore, the frequency of the reference signal supplied to the multiplier 156 remains unchanged. Further, in alternately reproducing negative azimuth tracks, the crosstalk component from front adjacent track is always detected by the BPF 106 for 17 KHz and the crosstalk component from the rear adjacent track by the BPF 107 for 46 KHz. As a result, the output phase of the differential amplifier 110 is not inverted at every field. The output of the amplifier 110 is, therefore, supplied to the tracking control circuit 111 by shifting the switch 151 to the terminal "b". The embodiment being arranged as described above, a satisfactory tracking control signal can be obtained even where tracks of the same azimuth are alternately reproduced at every field.

In a case where varied-speed reproduction is to be carried out with positive azimuth heads alternately used, the input SEA of the data selector is kept at H and the BPF 157 is used to take out the frequency component of 46 KHz therefrom. In the case of normal reproduction, the signals 30PG 3 15PG ∝ are used as the inputs SEA and SEB.

In the embodiments described, a video tape recorded by superimposing pilot signals of four different frequencies on a video signal is subjected to reproducing operations. However, in accordance with the invention, the number of different frequencies of the pilot signals to be superimposed is not limited to four. The invention is applicable also to other cases where pilot signals of six, eight or any other number of different frequencies are to be superimposed on the video tape as long as these pilot signals are recorded in some area outside of the video signal area of the tape.

In accordance with the invention, as described in the foregoing, a frequency signal to be next impressed is arranged to be determined on the basis of the reproduced output of the pilot signal recorded outside of the video signal area. The invention thus gives accurate tracking signals for reproducing operations at any desired tape speed without affecting reproduction of the video signal.

What we claim:

1. A video signal reproducing apparatus arranged to reproduce a composite signal formed by superimposing plural kinds of pilot signals of different frequencies upon a video signal one after another from recording tracks on a recording medium, said apparatus comprising:
    (a) a plurality of reproducing heads arranged to trace said recording tracks one after another on the recording medium;
    (b) switch-over means for producing the outputs of said plurality of reproducing heads by switching them over from one to another;
    (c) reference signal generating means for producing plural kinds of reference signals of different frequencies substantially the same as those of said pilot signals;
    (d) selecting means for selectively producing one of said plural kinds of reference signals generated by the reference signal generating means;
    (e) detection means for detecting the positional errors of said reproducing heads relative to said recording tracks by using the reference signal obtained from said selecting means in conjunction with at least one of said plural kinds of pilot signals included in the output of said switch-over means; and
    (f) control means for controlling said selecting means with the outputs of said reproducing heads not included in the output of said switch-over means.

2. An apparatus according to claim 1, further comprising:
    reproducing means for reproducing said video signal from the output of said switch-over means.

3. An apparatus according to claim 1, wherein said detection means includes a separation circuit arranged to separate said plural kinds of pilot signals from the output of said switch-over means.

4. An apparatus according to claim 3, wherein said detecting means further includes a multiplication circuit arranged to multiply the output signal from said separation circuit by the reference signal obtained from said selecting means.

5. An apparatus according to claim 1, wherein said control means includes a separation circuit arranged to separate said plural kinds of pilot signals from the outputs of said reproducing heads.

6. An apparatus according to claim 5, wherein said control means further includes a multiplication circuit which is arranged to multiply the output signal from said separation circuit by the reference signal obtained from said selecting means.

7. An apparatus according to claim 1, further comprising:
    adjusting means for adjusting the tracing positions of said reproducing heads on said recording medium according to the output of said detection means.

8. An apparatus according to claim 7, wherein said adjusting means includes shifting means arranged to shift said reproducing heads in a direction intersecting said recording tracks.

9. An apparatus according to claim 7, wherein said adjusting means includes moving means for moving said recording medium in a direction intersecting said recording tracks.

10. A video signal reproducing apparatus for reproducing a video signal from a recording medium having many recording tracks formed thereon, each of said recording tracks including a first area in which a composite signal formed by superimposing on said video signal plural kinds of pilot signals of different frequencies one after another is recorded and a second area in which at least one of said pilot signals is recorded, said apparatus comprising:
(a) a reproducing head arranged to trace said recording tracks;
(b) reproducing means for obtaining a reproduced video signal from said composite signal after said composite signal is reproduced from said first area by said reproducing head;
(c) reference signal generating means for generating plural kinds of reference signals of different frequencies which are substantially the same as those of said plural kinds of pilot signals;
(d) selecting means for selectively producing one of said plural kinds of reference signals generated by said generating means;
(e) detecting means for detecting the positional error of said reproducing head relative to said recording tracks by using the reference signal obtained from said selecting means in conjunction with at least one of said pilot signals included in a reproduced signal obtained by said reproducing head from said first area; and
(f) control means for controlling said selecting means by using a reproduced signal obtained from said second area by said reproducing head.

11. An apparatus according to claim 10, wherein said detecting means includes a separation circuit which is arranged to separate said plural kinds of pilot signals from the reproduced signal obtained by said reproducing head from said first area.

12. An apparatus according to claim 11, wherein said detecting means includes a multiplication circuit which is arranged to multiply the output signal of said separation circuit by the reference signal obtained from said selecting means.

13. An apparatus according to claim 10, wherein said control means includes a separation circuit which is arranged to separate said plural kinds of pilot signals from the reproduced signal obtained by said reproducing head from said second area.

14. An apparatus according to claim 13, wherein said control means further includes a multiplication circuit arranged to multiply the output signal of said separation circuit by the reference signal obtained from said selecting means.

15. An apparatus according to claim 10, further comprising:
adjusting means which is arranged to adjust the tracing position of said reproducing head on said recording medium according to the output of said detecting means.

16. A video signal reproducing apparatus for reproducing a video signal from a tape-shaped recording medium having many recording tracks formed thereon at even intervals in a direction intersecting the longitudinal direction of said recording medium, each of said recording tracks including a first area in which a composite signal formed by superimposing on said video signal pilot signals of different frequencies f1, f2, f3 and f4 one after another is recorded and a second area in which at least one of said pilot signals is recorded, said apparatus comprising:
(a) a pair of rotating heads arranged to trace said recording tracks on said recording medium;
(b) switch-over means for producing the output of said rotating heads by switching them over from one to the other;
(c) reference signal generating means arranged to generate reference signals of different frequencies f1, f2, f3 and f4;
(d) selecting means for selectively producing one of said reference signals generated by said generating means;
(e) detecting means for detecting the positional errors of said rotating heads relative to said recording tracks by using the reference signal obtained from said selecting means in conjunction with at least one of said pilot signals included in the output signal of said switch-over means; and
(f) control means for controlling said selecting means by using a reproduced signal obtained from said second area by said rotating heads.

17. An apparatus according to claim 16, wherein said composite signal is formed by superimposing said pilot signals of different frequencies one after another upon said video signal in the sequence of f1 - f2 - f4 - f3 - f1 ---.

18. An apparatus according to claim 17, wherein the frequencies of said pilot signal are in relations of $f1<f2<f3<f4$ and $f4 - f3 = f2 - f1$.

19. An apparatus according to claim 18, wherein said detecting means includes a separation circuit which is arranged to separate said pilot signals from the output of said switch-over mans.

20. An apparatus according to claim 19, wherein said detecting means further includes a multiplication circuit which is arranged to multiply the output signal of said separation circuit by the reference signal obtained from said selecting means.

21. An apparatus according to claim 20, wherein, assuming that there obtains a relation of $f4 - f3 = f2 - f1 = F1$, said detecting means further includes a first wave filter circuit which is arranged to wave filter a frequency component in the proximity of F1 from the output of said multiplication circuit.

22. An apparatus according to claim 21, wherein, assuming that there obtains a relation of $f4 - f2 = f3 - f1 = F2$, said detecting means further includes a second wave filter circuit which is arranged to wave filter a frequency component in the proximity of F2 from the output of said multiplication circuit.

23. An apparatus according to claim 22, wherein said detecting means further includes a comparison circuit which is arranged to compare the output of said first wave filter circuit with that of said second wave filter circuit.

24. An apparatus according to claim 18, wherein each of said recording tracks has said composite signal recorded therein with one of said pilot signals superimposed on the video signal.

25. An apparatus according to claim 24, wherein, among said recording tracks, adjacent tracks are recorded by heads which have their gaps arranged in different directions from each other.

26. An apparatus according to claim 25, wherein said control means includes a separation circuit which is arranged to separate said pilot signals from a reproduced signal obtained by said rotating heads from said second area.

27. An apparatus according to claim 26, wherein said control means further includes a multiplication circuit which multiplies the output signal of said separation circuit by the reference signal obtained from said selecting means.

28. An apparatus according to claim 27, wherein said pair of rotating heads have different gap directions from each other on said recording medium.

29. An apparatus according to claim 28, wherein said control means further includes a first wave filter circuit which is arranged to wave filter a frequency component in the proximity of f4 - f1 from the output of said multiplication circuit.

30. An apparatus according to claim 29, wherein said control means further includes a second wave filter circuit which is arranged to wave filter a frequency component in the proximity of f3 - f2 from the output of said multiplication circuit.

31. An apparatus according to claim 30, wherein said control means further includes an output switch-over circuit which is arranged to selectively produce either the output of said first wave filter circuit or that of said second wave filter circuit.

32. An apparatus according to claim 30, wherein said control means further includes a detection circuit which detects the level of a signal produced from said output switch-over circuit.

33. An apparatus according to claim 27, wherein said pair of rotating heads are arranged to have the same gap direction on said recording medium.

34. An apparatus according to claim 33, wherein the gap direction of said pair of rotating heads is identical with the gap direction of heads used in recording said composite signal having the superimposed pilot signal of frequency f2.

35. An apparatus according to claim 34, wherein assuming that there obtains a relation of f3 - f1 = f4 - f2 = F0, said control means further includes a wave filter circuit which is arranged to wave filter a frequency component in the proximity of F0 from the output of said multiplication circuit.

36. An apparatus according to claim 35, wherein said control means further includes a detection circuit which is arranged to detect the level of a signal produced from said wave filter circuit.

37. An information signal reproducing apparatus for reproducing an information signal from a recording medium which is recorded with plural kinds of pilot signals of different frequencies superimposed on said information signal one after another, said apparatus comprising:
(a) a reproducing head;
(b) reproducing means arranged to reproduce said information signal by using a part of a signal reproduced by said reproducing head;
(c) discriminating means for discriminating the kind of said pilot signal superimposed on said information signal reproduced by said reproducing means, said discriminating means being arranged to use for discrimination a part of the signal reproduced by said reproducing head which is not used by said reproducing means;
(d) reference signal generating means for generating a reference signal the frequency of which is arranged to be determined according to said discriminating means; and
(e) position control means for controlling the relative position of said head and said recording medium by using said reference signal in conjunction with said pilot signals included in the signal reproduced by said head.

* * * * *

UNITED STATES PATENT AND TRADEMARK OFFICE
CERTIFICATE OF CORRECTION

PATENT NO. : 4,558,382
DATED : December 10, 1985
INVENTOR(S) : Hiroo Edakubo, et al It is certified that error appears in the above-identified patent and that said Letters Patent is hereby corrected as shown below:

In the heading of the patent it should read:

--[30]    Foreign Application Priority Data

Feb. 2, 1983[JP]      Japan ..........58-15580 --

Signed and Sealed this

Ninth Day of September 1986

[SEAL]

Attest:

DONALD J. QUIGG

Attesting Officer    Commissioner of Patents and Trademarks